(12) United States Patent
Tian et al.

(10) Patent No.: US 11,410,287 B2
(45) Date of Patent: Aug. 9, 2022

(54) SYSTEM AND METHOD FOR ARTIFICIAL INTELLIGENCE BASED DETERMINATION OF DAMAGE TO PHYSICAL STRUCTURES

(71) Applicant: Genpact Luxembourg S.à r.l. II, Luxembourg (LU)

(72) Inventors: Siva Tian, New York, NY (US); Krishna Dev Oruganty, Long Island, NY (US); Adrita Barari, Kolkata (IN); Edmond Schneider, Henrico, VA (US); Nitish Kumar, Dedham, MA (US); Amit Arora, Princeton, NJ (US); Vikram Mahidhar, Lexington, MA (US); Chirag Jain, Bangalore (IN); Abhilash Nvs, Bhubaneswar (IN)

(73) Assignee: Genpact Luxembourg S.à r.l. II, Luxembourg (LU)

( * ) Notice: Subject to any disclaimer, the term of this patent is extended or adjusted under 35 U.S.C. 154(b) by 7 days.

(21) Appl. No.: 16/875,863

(22) Filed: May 15, 2020

(65) Prior Publication Data
US 2021/0142464 A1    May 13, 2021

Related U.S. Application Data

(60) Provisional application No. 62/897,864, filed on Sep. 9, 2019.

(51) Int. Cl.
| | |
|---|---|
| *G06T 7/11* | (2017.01) |
| *G06N 5/04* | (2006.01) |
| *G06T 7/00* | (2017.01) |
| *G06N 20/00* | (2019.01) |

(52) U.S. Cl.
CPC ............. *G06T 7/0002* (2013.01); *G06N 5/04* (2013.01); *G06N 20/00* (2019.01); *G06T 7/11* (2017.01); *G06T 2207/10024* (2013.01); *G06T 2207/20081* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,657,707 | B1* | 5/2020 | Leise ..................... | G06Q 10/20 |
| 10,994,727 | B1* | 5/2021 | Kumar ................... | G08G 1/162 |
| 2017/0156673 | A1* | 6/2017 | Uchida ................ | G06V 10/141 |
| 2017/0221110 | A1* | 8/2017 | Sullivan ............ | G06Q 30/0278 |
| 2017/0293894 | A1* | 10/2017 | Taliwal ................ | G06V 10/462 |
| 2018/0233035 | A1* | 8/2018 | Moreira-Matias ........................... G06F 16/2465 |

(Continued)

*Primary Examiner* — Omar S Ismail
(74) *Attorney, Agent, or Firm* — Goodwin Procter LLP

(57) ABSTRACT

A method and system are provided for assessing damage to a structure. According to one embodiment, the method includes using a classifier that is trained to associate respective portions of in an image of a structure with respective external parts of the structure to detect several of external parts of a structure in a first image of the structure. The method also includes using a first machine learning system, trained to perform segmentation of an image, to identify one or more image segments in a second image, where each image segment represents damage of a particular type and, using a second machine learning system, trained to associate image segments with external parts identified in an image, to associate a first image segment with a first external part, indicating damage to the first external part.

30 Claims, 7 Drawing Sheets

(56) References Cited

U.S. PATENT DOCUMENTS

| | | | |
|---|---|---|---|
| 2018/0260793 A1* | 9/2018 | Li | G06N 3/084 |
| 2018/0293552 A1* | 10/2018 | Zhang | G06N 20/20 |
| 2018/0300576 A1* | 10/2018 | Dalyac | G06V 10/255 |
| 2018/0350163 A1* | 12/2018 | Pofale | G07C 5/0808 |
| 2019/0039545 A1* | 2/2019 | Kumar | G08G 1/0112 |
| 2019/0050942 A1* | 2/2019 | Dalal | G06N 3/0454 |
| 2020/0034785 A1* | 1/2020 | Romano | G06V 20/00 |
| 2020/0034934 A1* | 1/2020 | Kroell | G06V 10/22 |
| 2020/0034958 A1* | 1/2020 | Campbell | G06T 7/0002 |
| 2020/0035045 A1* | 1/2020 | Kim | G06N 5/041 |
| 2020/0074178 A1* | 3/2020 | Guo | G06V 20/00 |
| 2020/0090321 A1* | 3/2020 | Xu | G06Q 10/10 |
| 2020/0349370 A1* | 11/2020 | Lambert | G06T 7/75 |

\* cited by examiner

SYSTEM AND METHOD FOR ARTIFICIAL INTELLIGENCE BASED DETERMINATION OF DAMAGE TO PHYSICAL STRUCTURES

CROSS-REFERENCE TO RELATED APPLICATIONS

This application claims priority to and benefit of U.S. Provisional Patent Application No. 62/897,864, entitled "System and Method for Car Damage Repair Estimate Using Convolutional Features and Probabilistic Knowledge Graphs," filed on Sep. 10, 2019, the entire contents of which are incorporated herein by reference.

FIELD

This disclosure generally relates to artificial intelligence (AI) based/machine learning (ML) techniques and, in particular, to training and use of AI/ML systems to: determine damage to physical structures and estimate the effort required to repair the damage by analyzing images of the physical structures.

BACKGROUND

Physical structures, such as vehicles, boats, machinery in industrial plants, buildings, etc. often get damaged due to collisions, other accidents, storms, etc. One way to assess the damage and to determine whether repairing the structure is viable and, if so, the kinds of repair needed, is to have one or more inspectors to inspect the structure. This can be impractical and/or time consuming in many cases. Another way to do this analysis is to take images (photographs, generally) of the damaged structure and to evaluate the images manually to assess the damage and to determine the required repairs. This process can also be laborious and time consuming. It may also require capturing the images of the damaged structure according to certain specified standards, such as required light, permitted angles and zoom, etc., so as to facilitate accurate determination of the damage. Moreover, a base image of the structure prior to the damage may also be required to assess the damage. This can increase the complexities and delays associated with the manual review of images.

SUMMARY

Methods and systems for training AI/ML systems and use of such systems for performing image analysis so that damage to physical structure can be determined accurately and efficiently, and the cost of repairing can be predicted, are disclosed. According to one embodiment, a method is provided for assessing damage to a structure. The method includes using a classifier that is trained to associate respective portions of in an image of a structure with respective external parts of the structure to detect several of external parts of a structure in a first image of the structure. The method also includes using a first machine learning system, trained to perform segmentation of an image, to identify one or more image segments in a second image, where each image segment represents damage of a particular type and, using a second machine learning system, trained to associate image segments with external parts identified in an image, to associate a first image segment with a first external part, indicating damage to the first external part.

BRIEF DESCRIPTION OF THE DRAWINGS

The present embodiments will become more apparent in view of the attached drawings and accompanying detailed description. The embodiments depicted therein are provided by way of example, not by way of limitation, wherein like reference numerals/labels generally refer to the same or similar elements. In different drawings, the same or similar elements may be referenced using different reference numerals/labels, however. The drawings are not necessarily to scale, emphasis instead being placed upon illustrating aspects of the present embodiments. In the drawings:

FIGS. 4A-1 and 4A-2 are flow charts showing training of one or more AI/ML systems and inferencing by the trained AL/ML systems for assessing damage to a structure using one or more images of the structure, according to various embodiments;

DETAILED DESCRIPTION

The following disclosure provides different embodiments, or examples, for implementing different features of the subject matter. Specific examples of components and arrangements are described below to simplify the present disclosure. These are merely examples and are not intended to be limiting.

Various embodiments described herein feature a technique for processing and analysis of images of physical structures in order to assess damage to the structures. The analysis is performed by one or more artificial intelligence (AI) based systems and/or one or more machine learning (ML) systems trained to isolate and identify from an image structural changes, such as damage to the structure. The discussion below uses a vehicle/car as an example of a physical structure that is analyzed and assessed, for the sake of convenience only. Embodiments of the technique are not so limited, however, and can be used to isolate and analyze changes in or damage to other structures, such as machinery, buildings, boats, etc.

Figure 1:
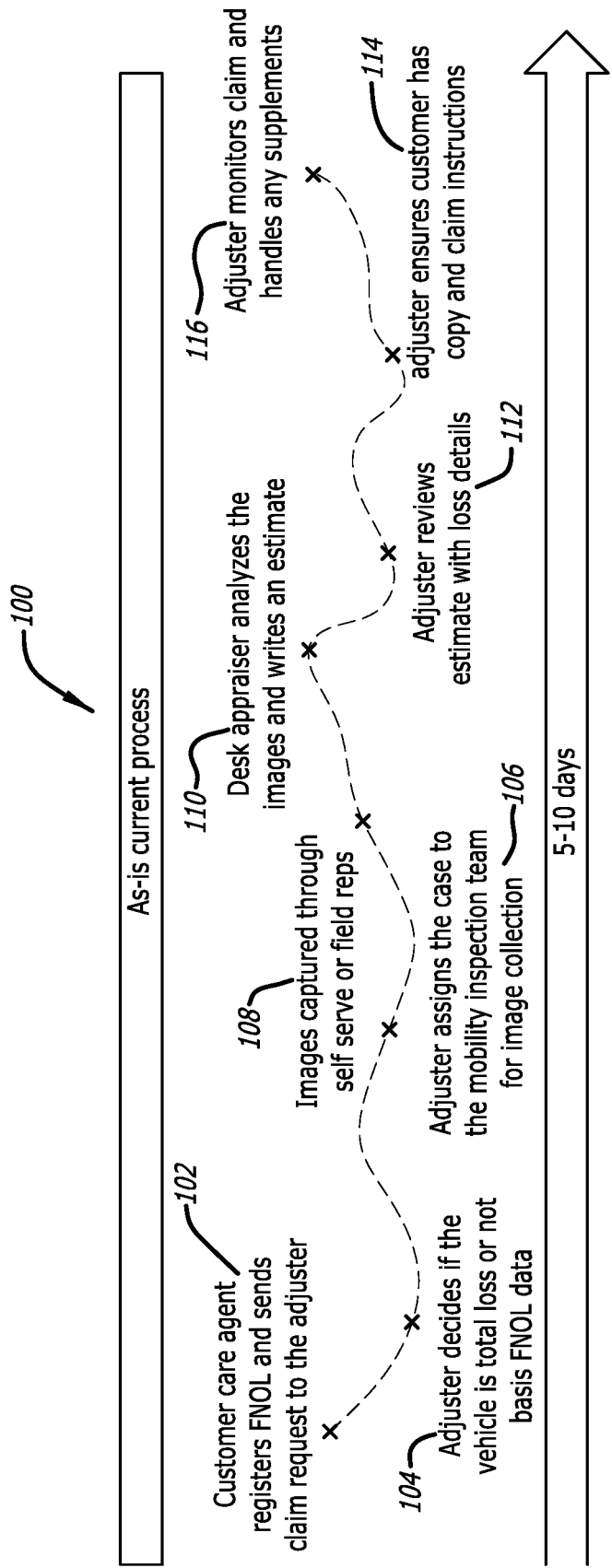
FIG. 1 illustrates a typical, conventional process used by some insurers to process a first notice of loss (FNOL)

When a car accident occurs, the persons involved typically call the insurance carrier and file a First Notice of Loss (FNOL), which helps determine the extent of damage to the car, and, subsequently, the liability and/or proper coverage for the required repairs. FIG. 1 illustrates a typical, conventional FNOL handling process 100 for processing insurance claims for damaged vehicles. In the process 100, an agent of the insurance carrier receives the FNOL and forwards it to an adjuster, at step 102. Using the information about the accident included in the FNOL, the adjuster may decide in step 104 whether the vehicle should be declared a total loss or may be repaired.

Upon determining that the vehicle is repairable, the damage thereto must be assessed, so in the optional step 106 the adjuster sends one or more inspectors to obtain images of the vehicle, sometimes at the scene of the accident or elsewhere. In some cases, rather than sending inspector(s) to obtain the images, the adjuster may decide to use the images of the vehicle obtained by the vehicle user or owner. The pictures taken by the inspector or the user/owner of the vehicle are received in step 108. Thereafter, in step 110, a human appraiser reviews the images, assesses the damage to the vehicle, and obtains a cost estimate to repair the vehicle. In step 112, the adjuster reviews the estimate, the details of the repairs needed, and the repairs that may be covered, and then advises the customer (e.g., the user/owner of the vehicle) of the approved repairs and instructions on having those repairs made, in step 114. The whole process usually takes a few days or even weeks. In the optional step 116, the adjuster may monitor the claim and process any supplemental requests for repair.

Some embodiments of a technique described herein feature artificial intelligence/machine learning enabled computer vision and analysis, so that different parts and/or components of a physical structure are recognized from one or more images of the structure. Any damaged parts and/or components of the structure may be identified, and the severity of the damage can be assessed automatically. Then, based on the nature of the damage and using external data sources (e.g., vehicle history, replacement part data, etc.,) repair cost can be estimated via robotic process automation (RPA). Some embodiments can thus automate the process of estimating vehicle damage and repair costs from a set of images of the vehicle, such as those taken at the site of the accident. This can facilitate an end-to-end transformation of the automobile insurance claims processing and can improve both the processing time and accuracy of claim processing.

Figure 2:
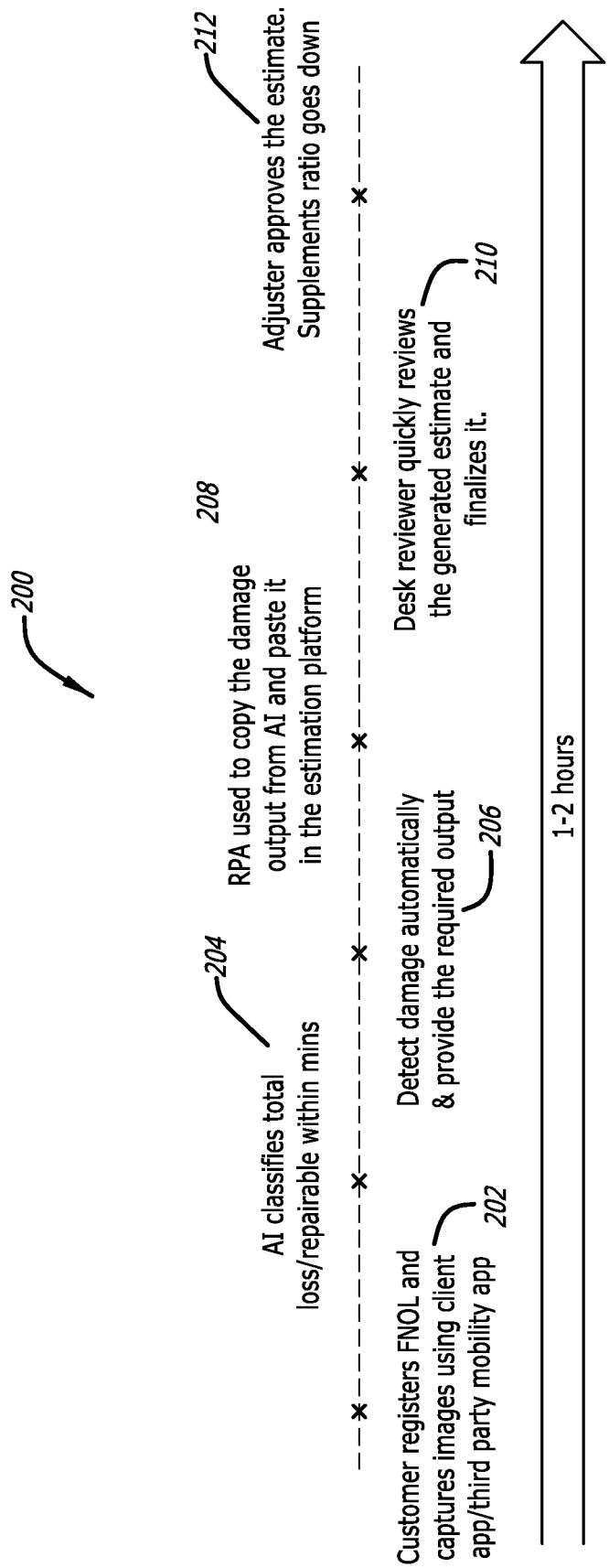
FIG. 2 illustrates an exemplary artificial intelligence (AI)/machine learning (ML) based process for assessing damage to a vehicle and for processing vehicle insurance claims, according to some embodiments.

FIG. 2 illustrates an exemplary artificial intelligence (AI)/machine learning (ML) based process 200 for assessing damage to a vehicle and for processing vehicle insurance claims. The execution of the process 200 can be called robotic process automation (RPA). In step 202, a customer captures image(s) of a vehicle involved in an accident and registers an FNOL, submitting therewith the captured image(s). A suitable device, such as a smartphone, tablet, digital camera, etc., may be used to capture the image(s), and they can be sent to the insurance company using an app supplied by the insurance company or using a third-party app.

In step 204, an AI/ML system analyzes the images received from the customer and determines whether the vehicle is a total loss or is repairable. To this end, the AI/ML system performs various machine vison tasks as described below in further details with reference to FIGS. 4A-1, 4A-2, and 4B. The AI/ML system may include more than one systems that are trained to perform different tasks. As part of determining whether a vehicle is repairable or not, the AI/ML system may identify various parts of the vehicle (e.g., the hood, a side door, the windshield, etc.) that are damaged. The detected damage can range from minor scratches to crushed or missing parts. This analysis and determination is generally based on images of only the external parts of the vehicle.

In step 206, the AI/ML system analyzes the information about the parts detected to be damaged and the types of damages, and predicts damage to any internal parts. Using this information, the AI/ML system then generates a list of repairs and replacements that are likely needed and predicts the required time and/or cost for the repairs and/or replacements. In step 208, as part of the overall RPA, the damage analysis and the repair/replacement estimates generated by the AI/ML system are presented in an estimation platform. The presentation may include images of the vehicle that are annotated by the AI/ML system, e.g., using bounding boxes, to identify the damaged parts and to mark the detected damage.

In step 210, a reviewer may review the estimates provided by the AI/ML system and the corresponding information, such that the original, processed, and/or annotated images of the vehicle. If the reviewer agrees with the estimates, they can be finalized. Otherwise, the reviewer may revise the estimates and this information can be used to train further the AI/ML system. An insurance adjuster may further review the finalized estimates in step 212 and, upon approval, repair/replacement instructions are sent to the user/owner of the vehicle.

Figure 3:
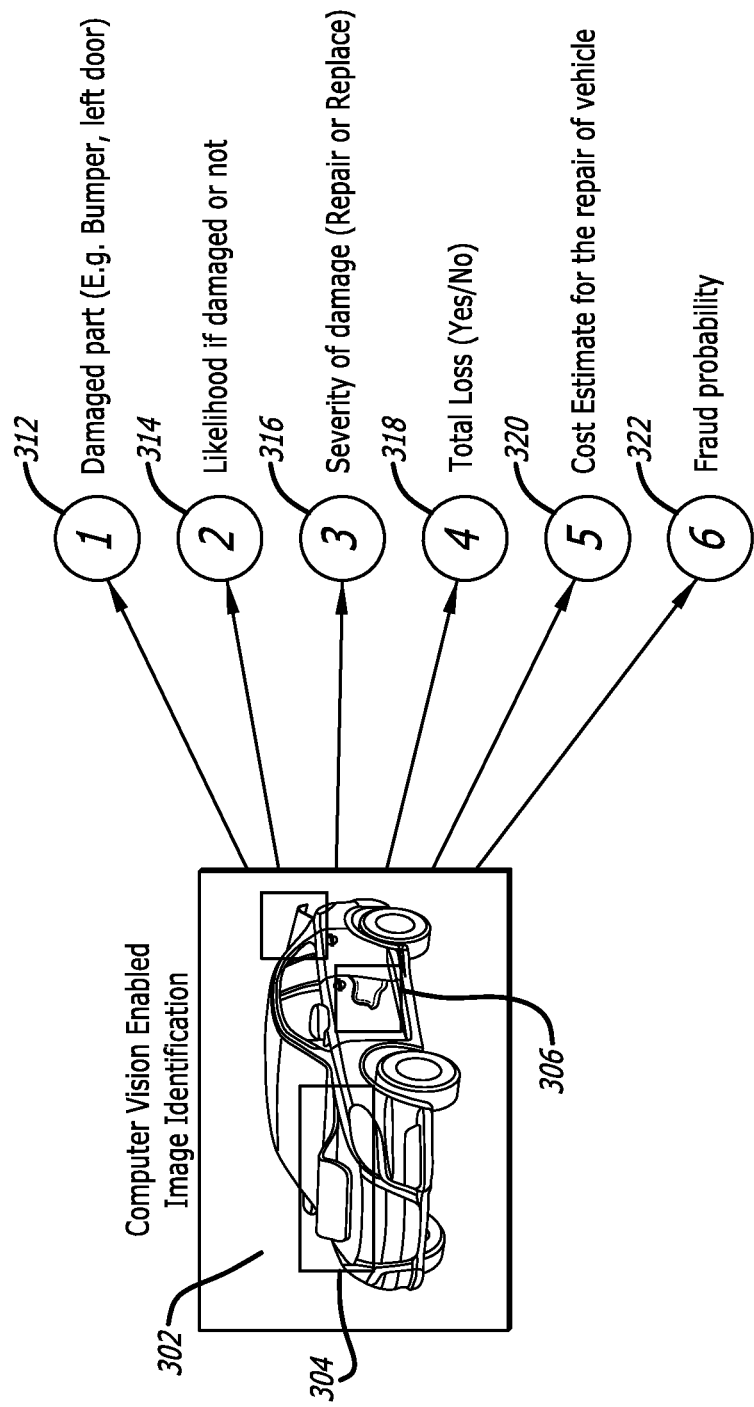
FIG. 3 shows various features of an AI/ML system for assessing damage to a vehicle, according to some embodiments.

FIG. 3 provides an overview of the different features of various embodiments of AI/ML systems in the context of assessing the damage to an automobile. These include analyzing an image 302 of a vehicle involved in an incident/accident. Identifying various different parts of the vehicle (e.g., the front bumper 304, the left front door 306, etc.) (Feature 1, 312). The features further include using AI/ML based machine vision and analysis to compute a likelihood that a particular part is damaged or not damaged (Feature 2, 314), and determining the severity of the damage (Feature 3, 316), if the part is determined to be damaged. The analysis of the severity of damage can also be used to determine whether the part may be repaired or whether it should be replaced (Feature 3, 316).

The features provided by the AI/ML system also include an aggregate analysis of all the parts of the vehicle that are determined to be damaged, taking into account the severity of the damage to each part, using which it is further determined whether the vehicle as a whole is a total loss or can be repaired (Feature 4, 318). If it is determined that the vehicle can be repaired, a time and/or cost estimate for the repair and/or replacement of the damaged parts is generated (Feature 5, 320). In some embodiments, the damage to a particular part is compared with historical data for similar vehicles, and/or such damage is analyzed in the context of damage to other parts of the vehicle, to determine where the damage to the particular part is fraudulent, i.e., not likely caused by the incident/accident (Feature 6, 322).

In order to provide these features, various embodiments use machine learning and image segmentation trained on vehicle images obtained from different views/angles. The use of such disparate images in training helps in providing a generalized image analysis and inferencing technique that can accurately identify vehicle damage from images of vehicles taken from many different angles, under different light conditions, and/or at different levels of zoom. Various embodiments also feature an estimation of not only the type of damage (e.g., scratch, dent, tear, crush, crumple, loose parts, missing parts, glass break, etc.) to a particular part but also an estimate of the size of the damage, from the images of the vehicle. The estimation of the size of the damage can increase the accuracy of repair estimates because both the location and size of damage typically impact the required repair.

Figures 1, 4A:
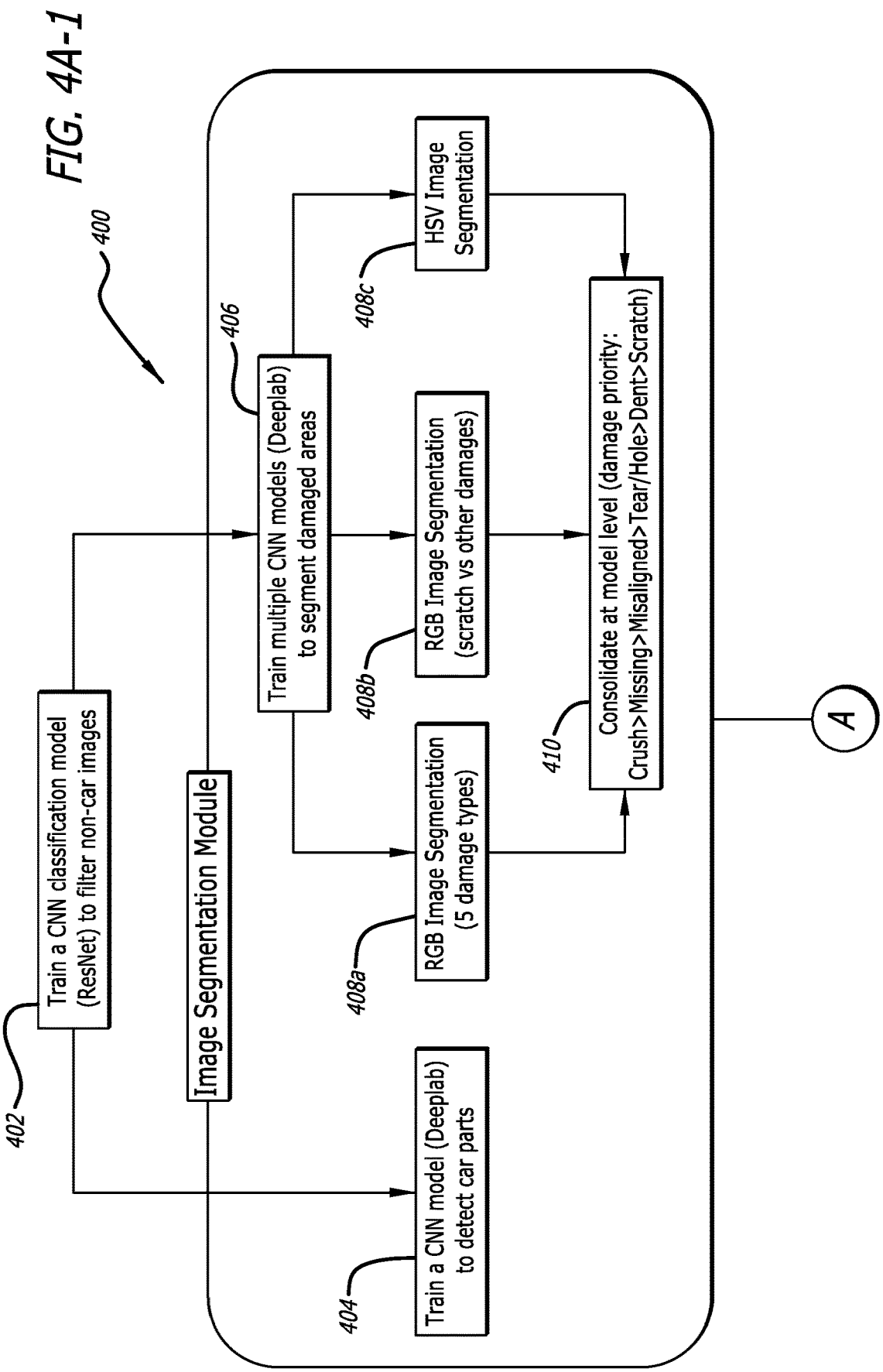
Figures 2, 4A:
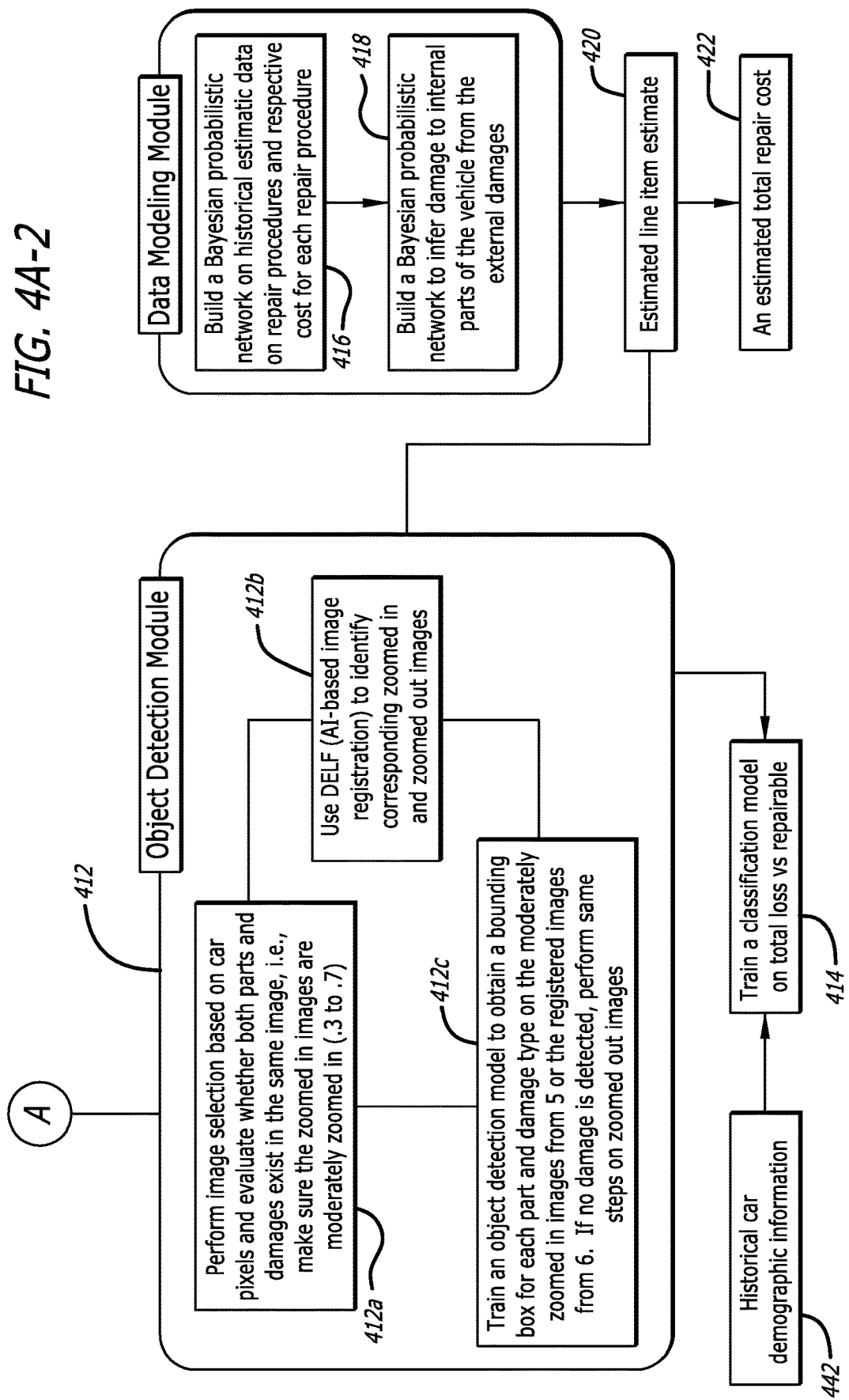
Figure 4B:
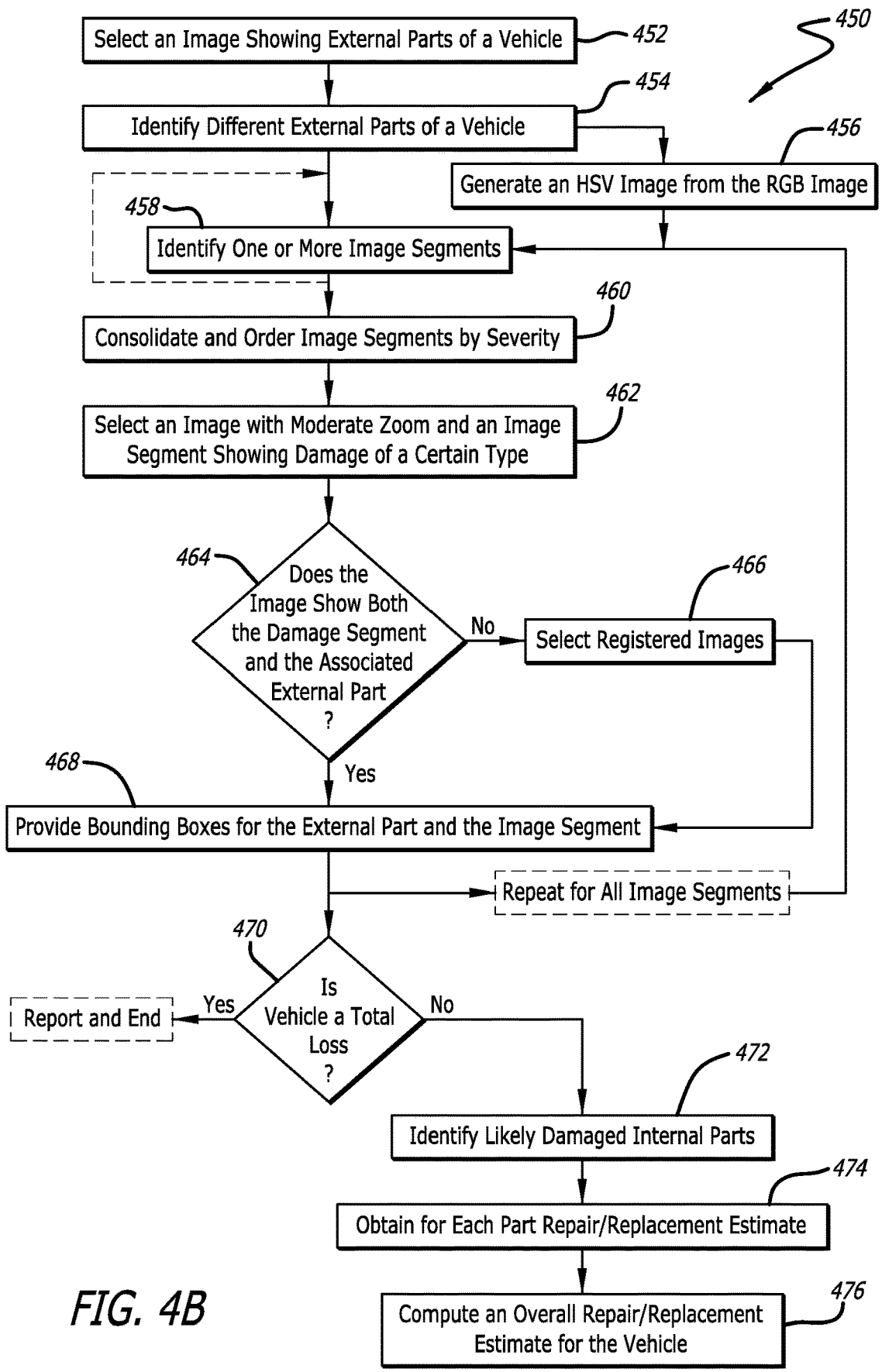
FIG. 4B is a flow chart showing inferencing using AL/ML systems for assessing damage to a structure using one or more images of the structure, according to various embodiments.

FIGS. 4A-1 and 4A-2 illustrate an exemplary process 400 for generating a repair estimate, according to some embodiments. The process 400 includes two kinds of steps: (A) the steps involved in training an AI/ML system, using sets of images showing damage to different vehicle parts, to perform various classification and inferencing tasks, and (B) the steps involved using the AL/ML system to perform these tasks, given a new set of images that were not used during the training phase. Although the process 400 shows these different kinds of steps as integrated, this is for the convenience of explanation only. It should be understood that the two different kinds of steps are generally not intermingled, i.e., usually either only the training steps are performed during the training phase or only the inferencing steps are performed during the inferencing phase. FIG. 4B shows an exemplary inferencing process 450, in which only the inferencing steps are shown.

In step 402 (FIG. 4A-1), an AI/ML system (e.g., an artificial neural network (ANN) or, more specifically, a convolutional neural network (CNN), such as ResNet™, a regional CNN (R-CNN), a masked R-CNN, a deep neural network such as Deeplab™, a deep local feature (DELF) image registration, etc.) is trained using various images of vehicles and other images, to filter out non-vehicle images. The AI/ML system is also trained using images of the exterior and interior of vehicles, to filter out images of the interior of the vehicle. Images provided by typical vehicle users/owners are used for training and, since the AI/ML system is trained to filter out non-vehicle and interior images, no specialized training is needed for obtaining the images.

During inferencing, a trained AL/ML system can be used to select from a set of received images the images of the exterior of a vehicle (step 452, FIG. 4B). Generally, only the images of the exterior of the vehicles are used for inferencing, i.e., for the estimation of the time and cost of repairing the vehicle. In the inferencing phase, like in the training phase, images obtained without any special training, and those provided by typical vehicle users/owners are used. Moreover, in various embodiments, the technique described herein does not require alignment between the images of a vehicle (a physical structure, in general) obtained before and after the damage, making the AI/ML based system fast and easy to use.

In step 404 (FIG. 4A-1), the same or another AI/ML system is trained to identify different parts of a vehicle from one or more images of the exterior of the vehicle. In some embodiments, the AI/ML system can identify 24 different exterior car parts, namely, back glass, fender left, fender right, front bumper, front door left, front door right, front lamps left, front lamps right, grille, hood, quarter panel left, quarter panel right, rear bumper, rear door left, rear door right, rear lamps left, rear lamps right, roof, trunk lid, wheels front left, wheels front right, wheels rear left, wheels rear right, and windshield. During inferencing, a trained AI/ML system can be used to identify different parts of a vehicle from images of the exterior of the vehicle (step 454, FIG. 4B).

In step 406 (FIG. 4A-1), one or more instances of the same or another AI/ML system are trained to perform one or more classification and/or inferencing tasks. In one case, an instance of an AI/ML system is trained to perform image segmentation and, specifically, to identify and distinguish between different kinds of structural damage, such as, e.g., scratch; dent (which may include crease, or buckle); crush or crumple; tear, hole, or crack; misaligned part or loose part; missing part; glass break; etc. In some embodiments, the classification is done among five damage types. In other embodiments, classification between fewer or more damage types may be performed. Segmentation can improve the accuracy of the repair estimates.

In another case, an instance of an AI/ML system is trained to perform image segmentation and, specifically, to identify and distinguish between scratches and/or minor dents and all other types of damage. In many car accidents (up to 70% by some estimates), the damage is limited to scratches and small dents, where it is not necessary to analyze further if any internal parts of the vehicle are also damaged. Therefore, a classification using such an instance of the AI/ML system can be used to expedite the overall claim analysis, by limiting the analysis of damage to internal parts of the vehicle only to the cases of more severe external damage.

In yet another instance, the received images, which are typically provided in the red-green-blue (RGB) colorspace, are first converted into the Hue, Saturation, lightness Value (HSV) colorspace. Thereafter, an instance of the same or another AI/ML system is trained to perform image segmentation of the images in the HSV space, and to identity in those images damage of different types, such as those listed above. While training of three instances of the AI/ML system is described above, it should be understood, that some embodiments may include training only one instance and other embodiments may include training different numbers of instances (e.g., 2, 4, 8, etc.) of the AI/ML system. In some embodiments, an AI/ML system such as a mask-R-CNN is used that can perform instance segmentation not only to classify a pixel into one of a selected number of damage types, but also to determine if there are overlapping segments of different types of damage within a particular region of an image, where the pixel may belong to two or more segments. For example, if a scratch overlaps a dent, the pixels located in the overlapping area belong to two segments, one corresponding to the scratch and the other corresponding to the dent.

The use of a different colorspace (e.g., HSV) to detect and classify damage can enhance the accuracy of damage detection/classification. In the RGB colorspace, both the color and light intensity are encoded in each channel (red, green, or blue) of the image. This can make it difficult to improve the signal-to-noise ratio of light and shadows. By converting the RGB images into the HSV images, the color information (in the hue channel) can be separated from the saturation and light values. This can help enhance the signal-to-noise ratio of light and shadows in determining damage types (such as dents, crush, etc.) using a three-dimensional (3D) profile.

During inferencing, in the optional step 456 (FIG. 4B), one or more of the received images are transformed from the RGB colorspace into the HSV colorspace. At step 458 (FIG. 4B), an instance of an AI/ML system trained in a particular way (e.g., according to the different ways of training that are described above with reference to the step 406 (FIG. 4A-1)) is used to classify one or more of the received images. The step 458 (FIG. 4B) may be executed once or more, using in each execution a different instance of the AI/ML system trained in a different manner. These different instances may use one or more of the received images in the RGB colorspace or transformed images in the HSV colorspace. The different executions of the step 458 may be performed sequentially or in an at least partially parallelized manner.

In each execution of the step 458 (FIG. 4B), the images are classified. For example, in step 408a (FIG. 4A-1), the images are classified according to a selected number (e.g., 4, 5, 7, etc.) of damage types. In step 408b (FIG. 4A-1) the images are classified between scratch and small dents as one class and the other types of damage as another class. In step 408c (FIG. 4A-1), a classification according to the step 408a or 408b is performed using one or more images in the HSV colorspace.

In step 410 (FIG. 4A-1) (and also in step 460, FIG. 4B), the classification of the images in different ways is consolidated, and the classified image segments may be ordered according to the severity of the damage type and/or the size of the segment. For example, in some cases, the damage types are ranked from the most severe to the least sever as: crush or crumble; missing part; misaligned part; tear or hole; dent; and scratch.

Generally in step 412 (FIG. 4A-2), the same or another AI/ML system is trained to associate damage segments of a structure (e.g., a car) with one or more external parts of the structure. Recall, the same or another AI/ML system was trained to recognize such parts in step 404. To this end, in step 412a, an image is selected from the received images based on the zoom information included in the image or represented by the image pixels. Specifically, a moderately zoomed image, e.g., having a scaling factor in the range 0.3 to 0.7 is selected, and in step 412a it is determined if the image includes both an identifiable external part and an associated damage segment. The scaling factor has a range of 0 to 1, where 0 indicates a zoomed-in image with no parts boundary shown and 1 indicates a zoomed-out image where the entire vehicle is shown.

The same or another AI/ML system (e.g., deep local feature (DELF) image registration AI/ML system) may be trained to perform image registration, i.e., to associate a zoomed-in image from which a damage segment can be identified and a zoomed-out image in which an external part can be identified, where the damage segment indicates a damage to the identified part. For example, a zoomed-in image may show a crush segment, and the corresponding zoomed-out image can show a crushed hood. In another example, a zoomed-in image may show a small-dent segment and the corresponding zoomed-out image may show a front left door having a small dent.

In some embodiments, the AI/ML system is trained to perform registration between at least one image showing the entire vehicle and several other zoomed-in images showing damage to different regions and parts of the vehicle. Registration may be done during the training and/or inferencing phases, using both geometric primitives, e.g., using the Binary Robust Invariant Scalable Key points (BRISK) process, which is a feature point detection and description process with both scale invariance and rotation invariance. In some embodiments, a feature descriptor of the local image is constructed through the gray scale relationship of random point pairs in the neighborhood of the local image. A binary feature descriptor may be used for AI based keypoint extraction (e.g., DELF). Some embodiments may search for a given selected image a matching image in a database of pre-processed images, in order to obtain registered images.

If no moderately zoomed image showing both a damage segment and the associated external part is found in step 412a, registered images, i.e., corresponding zoomed-in and zoomed-out images are selected in step 412b. In step 412c, the same or another AI/ML system is trained to provide a bounding box for one or more identified external parts in a moderately zoomed image, where the image regions of the part(s) have corresponding damage segments. A bounding box is provided for each damage segment, as well. If no moderately zoomed image showing both a part and the associated damage segment is available, the registered images obtained from the step 412b are used, and the same or the other AI/ML system is trained to provide a bounding box for one or more identified external parts in a zoomed-out image and a bounding box for one or more damage segments in the zoomed-in image that is registered with or is associated with the zoomed-out image.

During inferencing, an image having moderate zoom is selected in step 462 (FIG. 4B), and it is determined if the image includes both an identifiable external part and an associated damage segment. If such an image is not found, the available images are registered and registered images are selected, using an AI/ML system such as deep local feature (DELF) image registration, in step 466 (FIG. 4B). The accuracy of damage detection can be improved using zoomed-in images, especially for the detection of scratches and dents. Thus, the registration step 466 can improve the overall accuracy of damage detection. In step 468 (FIG. 4B), an AI/ML system is used to provide bounding boxes for the identified external part and the associated damage segment(s) in the moderately zoomed image or in the registered images.

Referring back to FIG. 4A-2, in step 414 the same or another AI/ML system is trained to analyze the images having bounding boxes and to determine, based on a number of factors, whether the vehicle (a physical structure, in general) should be declared a total loss or repairable. The factors considered may include the number of damage segments identified, the number and/or size of the associated external parts, the size of the damage segments, the severity of damage, etc. The AI/ML system may also use historical information 442 about the vehicle, such as accident statistics and a percentage of times at which the vehicle was declared a total loss, etc. During inferencing, in step 470 (FIG. 4B) a trained AI/ML system is used to analyze the images having bounding boxes and to determine, based on one or more of the several factors listed above, whether the vehicle should be declared a total loss or repairable.

In step 416 (FIG. 4A-2), during the training phase, several images having bounding boxes identifying external parts of vehicles and damage segments are analyzed. A Bayesian probabilistic network or a maximum-likelihood detector, called cost predictor, is built for different external parts and for different types of damage to each part using historical data on repair procedures and cost, where the cost predictor can predict for a particular type of damage to a particular external part, the kind of repair needed and the estimated time and cost of the repair or replacement of the part. In step 418 (FIG. 4A-2), another Bayesian probabilistic network or a maximum-likelihood detector, called internal-parts-predictor, is built to predict, given an external part and one or more damage segments associated with that part, one or more internal parts that would also be likely damaged and would need repair or replacement. A probabilistic graph may be used to derive interior damage from images showing exterior damage.

During inferencing, in step 472 (FIG. 4B) for an analyzed image, for each external part identified in the image and for each damage segment associated with the identified part, one or more internal parts that would also likely require repairs or replacement are identified using the internal-parts predictor. In this analysis, maximum likelihood detection and/or the available historical data may be used and a bounding box for a particular external part of a vehicle may be subdivided into smaller bounding boxes identifying different regions of the part, to increase the accuracy of the estimation of the interior damage. For example, on a car door, a dent near the center of door is unlikely to require repairs to any internal parts, but a dent near the door handle may require further repairs to or replacement of the door handle.

In step 420, FIG. 4A-2 and step 474, FIG. 4B, for an analyzed image, for each external part identified in the image and for each damage segment associated with the identified part and, optionally, for each internal part identified in step 472 (FIG. 4B), a time and/or cost estimate for repair or replacement is obtained using the cost predictor.

The time and/or cost estimation may use historical data to estimate the required labor hours and/or other external databases to obtain the costs of replacement parts and/or the prevailing labor rates in the geographic region where the repairs may take place. An accurate estimate for the repair or replacement of a part can be obtained by taking into account the cost of the replacement part and the product of the estimated labor hours and labor rate.

In step 422, FIG. 4A-2 and step 476, FIG. 4B, the time and cost estimates for repairing various parts are aggregated, to provide an overall estimate of the time and/or cost of repairing the vehicle. In some cases, a comparison of the estimated total repair cost and the cost to replace the vehicle as a whole can be used to determine again whether the repairs should be performed or whether the vehicle should be declared a total loss, according to the policy of the insurance company.

Figure 5:
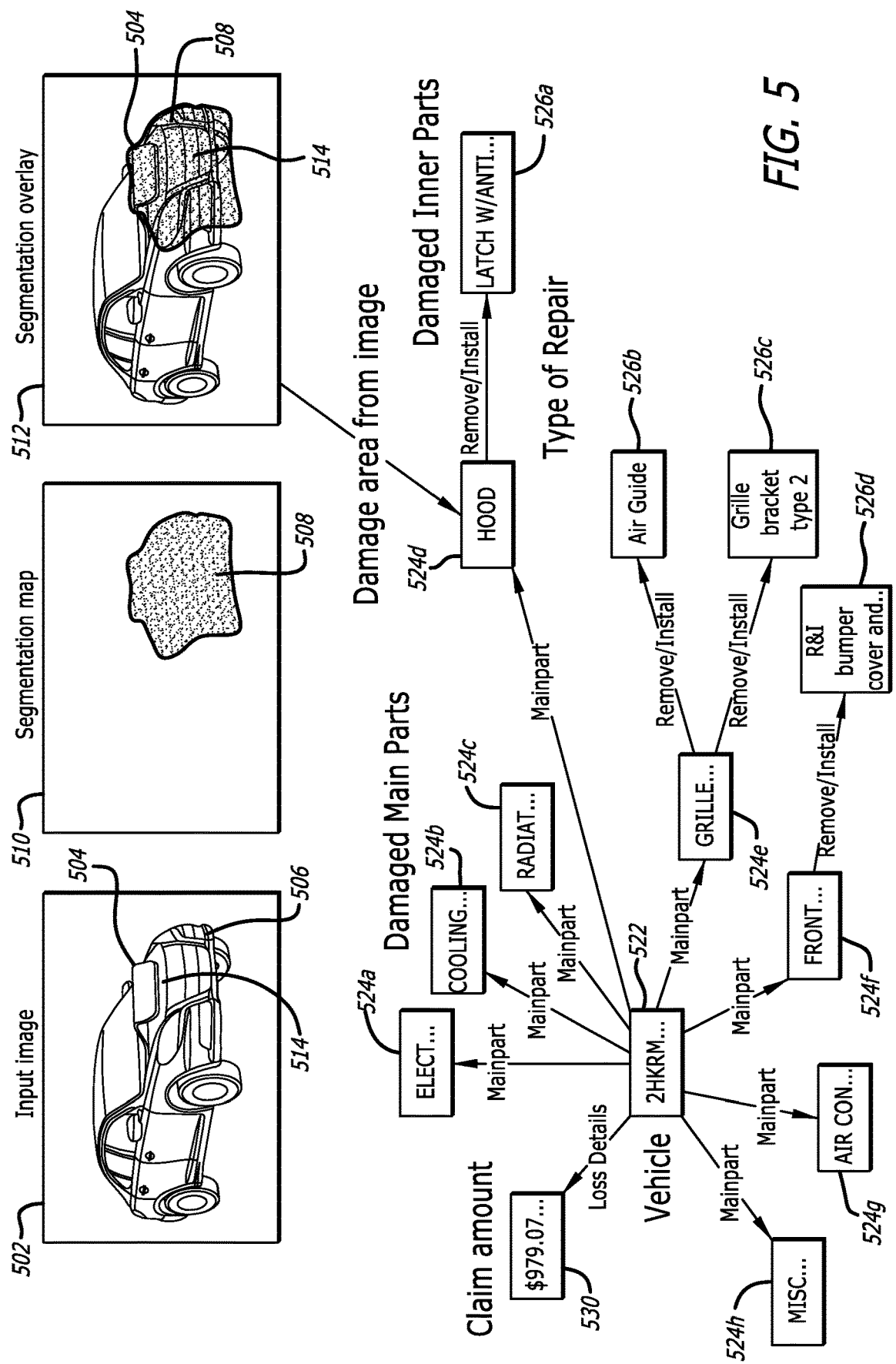
FIG. 5 schematically depicts the use of a damage database in identifying from the information about damaged external parts the internal parts of a vehicle that may also be damaged, according to some embodiments.

FIG. 5 illustrates how the inferences of damage to an external part, the type and size of the damage, and/or the location of the damage within the external part, obtained using embodiments of an AI/ML system, in combination with historical damage and repair data, can be used to derive probabilities of damage to various internal parts. As one example, by analyzing the received image 502, an AI/ML system identified various parts of the car, including the hood 504 and the front bumper 506. After segmentation, the AI/ML system determined that a region defined by a segmentation map 508 was crumpled or crushed, as shown in a modified image 510.

The association of the segmentation map 508 with the identified external parts of the car revealed that the hood 504 is crumpled or crushed, as shown in the overlay image 512. Further, fine-grain analysis revealed that an external part grille 514 was damaged, as well. Another segmentation map and its association with the identified car parts may reveal a misaligned front bumper 506.

The vehicle in the image 502 may be identified by its make, model, and year of manufacturing. This information may also be supplied by the user/owner of the vehicle. The historical data for the identified vehicle, represented by node 522, includes nodes 524*a*-524*h* corresponding to several different external parts and subparts that may be damaged. Historical data further indicates that a damaged hood, node 524*d*, indicates likely damage to an internal part latch, node 526*a*. Similarly, per the historical data, a damaged grille, node 524*e*, indicates likely damage to one or more internal parts, e.g., an air guide, node 526*b*, and a grille bracket type 2, node 526*c*. Likewise, damage to the front bumper, node 524*e*, indicates likely damage to a bumper cover 526*c*, according to the historical data. The repair/replacement costs of these parts may be obtained individually or in the aggregate from a cost node 530.

As described with reference to FIGS. 4A-2, steps 416-422, and FIG. 4B, steps 472-476, embodiments of Bayesian networks trained using historical repairs and claims data in combination with the inferences of damaged external parts can provide a probabilistic estimate of the internal parts that may need to be repaired/replaced, based on the extent of damage to one or more external parts of the vehicle.

In various embodiments, the AI/ML based image analysis and inferencing technique described herein can increases the accuracy and/or efficiency of both (a) assessing damage to structures, and (b) identifying remedial measures to repair the damage. As one example, this is beneficial to insurance companies and their customers by facilitating faster than convention and more accurate insurance claims processing, decreasing the cycle time for processing claims from 5-10 days to just a few hours or even in near-real time (e.g., in a few minutes). This can be done without having to wait to hire and train new human assessors and adjustors. Other examples include efficient maintenance of industrial plants, where different types of machinery can become damaged over time, e.g., due to exposure to extreme weather conditions, radiation, etc.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated.

What is claimed is:

1. A method for assessing damage to a structure, the method comprising:
   detecting, with a classifier, a plurality of external parts of a first structure in a first image, wherein the classifier is trained to associate portions of an image of a structure with respective external parts of the structure;
   identifying, with a first machine learning system, one or more image segments in a second image with each image segment in the second image representing damage of a particular type, wherein the first machine learning system is trained to perform segmentation of an image;
   associating, with a second machine learning system, a first image segment identified from the second image with a first external part detected in the first image, wherein the first image segment is indicating damage to the first external part and the second machine learning system is trained to associate image segments with external parts identified in an image;
   identifying, with a subsystem trained from historical repair data, one or more internal parts of the structure that are associated with the first external part and that are likely to require replacement or repair, or obtaining, with the subsystem trained from the historical repair data, an estimate of repairing or replacing the first external part based on a severity or size of at least one of the one or more associated image segments;
   selecting from the plurality of external parts, all external parts, other than the first external part, that have associated therewith one or more image segments;
   repeating for each selected external part the operations of identifying one or more internal parts and obtaining an estimate; and
   aggregating respective estimates for each selected external part to obtain an overall estimate of repairing the structure.

2. The method of claim 1, wherein associating the first image segment with the first external part comprises providing a bounding box for the first image segment and a bounding box for the first external part.

3. The method of claim 1, wherein the second image is same as the first image.

4. The method of claim 1, wherein:
the first image is provided in red-green-blue (RGB) colorspace; and
the second image is provided in hue-saturation-lightness-value (HSV) colorspace,
the method further comprising transforming the first image in the RGB colorspace into the second image in the HSV colorspace.

5. The method of claim 1, further comprising:
performing, using a third machine learning system trained to register one or more images with another image, image registration for a plurality of images comprising the first and second images, wherein:
a zoom-in factor of the first image is smaller than a zoom-in factor of the second image; and
the second image is registered with the first image.

6. The method of claim 1, wherein the first machine learning system is trained to perform segmentation based on at least three damage types.

7. The method of claim 1, wherein the first machine learning system is trained to perform segmentation based on two classes of damage types, wherein a first class comprises scratch or dent damage and the second class comprises tear, hole, misaligned part, missing part, crumple, or crush damage.

8. The method claim 1, further comprising:
associating a second image segment with the first external part, indicating additional damage to the first external part; or
associating the second image segment with a second part, indicating damage to a different external part of the structure.

9. The method claim 1, further comprising:
using a fourth machine learning system, trained to perform a binary classification using historical damage data and associated image segments and external parts:
determining, based on one or more associations between the one or more segments and the plurality of external parts, a scope of damage to the structure; and
determining, based on the scope of the damage, whether repair to the structure is viable.

10. The method claim 1, wherein the estimate of repairing or replacing the first external part comprises estimates of repairing or replacing the associated one or more internal parts.

11. The method of claim 1, wherein the estimate comprises one or more of: a time estimate, or a cost estimate, wherein:
the time estimate is based on a required number of labor hours; and
the cost estimate is based on one or more of: the required number of labor hours; a labor rate; a cost of the first external part; or a cost of at least one internal part associated with the first external part.

12. The method of claim 1, wherein the structure comprises a damaged vehicle, the method further comprising:
receiving one or more images of the damaged vehicle at a computing system of an insurer;
reviewing by an insurance adjuster the association between the first image segment and the first external part, wherein the first image segment and the first external part are displayed with respective bounding boxes; and
finalizing by the insurance adjuster the overall estimate.

13. A system for assessing damage to a structure, the system comprising:
a processor; and
a memory in communication with the processor and comprising instructions which, when executed by the processor, program the processor to:
detect, with a classifier, a plurality of external parts of a first structure in a first image, wherein the classifier is trained to associate portions of an image of a structure with respective external parts of the structure;
identify, with a first machine learning system, one or more image segments in a second image with each image segment in the second image representing damage of a particular type, wherein the first machine learning system is trained to perform segmentation of an image;
associate, with a second machine learning system, a first image segment identified from the second image with a first external part detected in the first image, wherein the first image segment is indicating damage to the first external part and the second machine learning system is trained to associate image segments with external parts identified in an image;
identify, with a subsystem trained from historical repair data, one or more internal parts of the structure that are associated with the first external part and that are likely to require replacement or repair, or obtain, with the subsystem trained from the historical repair data, an estimate of repairing or replacing the first external part based on a severity or size of at least one of the one or more associated image segments;
select from the plurality of external parts, all external parts, other than the first external part, that have associated therewith one or more image segments;
repeat for each selected external part the operations: (i) identify one or more internal parts and (ii) obtain an estimate; and
aggregate respective estimates for each selected external part, to obtain an overall estimate of repairing the structure.

14. The system of claim 13, wherein the instructions program the processor or a different processor to function as one or more of the classifier, the first machine learning system, or the second machine learning system.

15. The system of claim 13, wherein to associate the first image segment with the first external part the instructions program the processor to provide a bounding box for the first image segment and a bounding box for the first external part.

16. The system of claim 13, wherein the second image is same as the first image.

17. The system of claim 13, wherein:
the first image is provided in red-green-blue (RGB) colorspace;
the second image is provided in hue-saturation-lightness-value (HSV) colorspace; and
the instructions further program the processor to transform the first image in the RGB colorspace into the second image in the HSV colorspace.

18. The system of claim 13, wherein the instructions further program the processor to:
perform, using a third machine learning system trained to register one or more images with another image, image registration for a plurality of images comprising the first and second images, wherein:

a zoom-in factor of the first image is smaller than a zoom-in factor of the second image; and the second image is registered with the first image.

19. The system of claim 18, wherein the instructions program the processor or a different processor to function as the third machine learning system.

20. The system of claim 13, wherein the first machine learning system is trained to perform segmentation based on at least three damage types.

21. The system of claim 13, wherein the first machine learning system is trained to perform segmentation based on two classes of damage types, wherein a first class comprises scratch or dent damage and the second class comprises tear, hole, misaligned part, missing part, crumple, or crush damage.

22. The system of claim 13, wherein the instructions further program the processor to:
    associate a second image segment with the first external part, indicating additional damage to the first external part; or
    associate the second image segment with a second part, indicating damage to a different external part of the structure.

23. The system of claim 13, wherein the instructions further program the processor to:
    use a fourth machine learning system, trained to perform a binary classification using historical damage data and associated image segments and external parts, to:
        determine, based on one or more associations between the one or more segments and the plurality of external parts, a scope of damage to the structure; and
        determine based on the scope of the damage, whether repair to the structure is viable.

24. The system of claim 23, wherein the instructions program the processor or a different processor to function as the fourth machine learning system.

25. The system of claim 23, wherein the instructions program the processor or a different processor to function as the subsystem.

26. The system claim 13, wherein the estimate of repairing or replacing the first external part comprises estimates of repairing or replacing the associated one or more internal parts.

27. The system of claim 13, wherein the estimate comprises one or more of: a time estimate, or a cost estimate, wherein:
    the time estimate is based on a required number of labor hours; and
    the cost estimate is based on one or more of: the required number of labor hours; a labor rate; a cost of the first external part; or a cost of at least one internal part associated with the first external part.

28. The system of claim 13, wherein the structure comprises a damaged vehicle, and the instructions further program the processor to function as a computing system of an insurer, that is programmed to:
    receive one or more images of the damaged vehicle at a computing system of an insurer;
    prompt by an insurance adjuster a review of the association between the first image segment and the first external part, wherein the first image segment and the first external part are displayed with respective bounding boxes; and
    prompt by the insurance adjuster finalization of the overall estimate.

29. A method for assessing damage to a structure, the method comprising:
    detecting, with a classifier, a plurality of external parts of a first structure depicted in a first image, wherein the first image is provided in RGB colorspace and the classifier is trained to associate portions of an image of a structure with respective external parts of the structure;
    transforming the first image in the RGB colorspace into a second image in HSV colorspace;
    identifying, with a first machine learning system, one or more image segments from the second image, wherein the second image is provided in the HSV colorspace, each image segment in the second image represents damage of a particular type, and the first machine learning system is trained to perform segmentation of an image; and
    associating, with a second machine learning system, a first image segment identified from the second image with a first external part detected in the first image, wherein the first image segment indicates damage to the first external part and the second machine learning system is trained to associate image segments with external parts identified in an image.

30. A system for assessing damage to a structure, the system comprising:
    a processor; and
    a memory in communication with the processor and comprising instructions which, when executed by the processor, program the processor to:
        detect, with a classifier, a plurality of external parts of a first structure depicted in a first image, wherein the first image is provided in RGB colorspace and the classifier is trained to associate portions of an image of a structure with respective external parts of the structure;
        transforming the first image in the RGB colorspace into a second image in HSV colorspace;
        identify, with a first machine learning system, one or more image segments from the second image, wherein the second image is provided in the HSV colorspace, each image segment in the second image represents damage of a particular type, and the first machine learning system is trained to perform segmentation of an image; and
        associate, with a second machine learning system, a first image segment identified from the second image with a first external part detected in the first image, wherein the first image segment indicates damage to the first external part and the second machine learning system is trained to associate image segments with external parts identified in an image.

* * * * *